(12) United States Patent
Vitic et al.

(10) Patent No.: US 10,908,474 B2
(45) Date of Patent: Feb. 2, 2021

(54) OPTICAL MODULATOR AND OPTICAL MODULATOR DRIVER DEVICES AND METHODS UTILIZING INDEPENDENT ARM BIAS TO MITIGATE FABRICATION ERRORS

(71) Applicant: Ciena Corporation, Hanover, MD (US)

(72) Inventors: Michael Vitic, Chelsea (CA); Alexandre Delisle-Simard, Québec (CA); Michel Poulin, Québec (CA)

(73) Assignee: Ciena Corporation, Hanover, MD (US)

( * ) Notice: Subject to any disclaimer, the term of this patent is extended or adjusted under 35 U.S.C. 154(b) by 147 days.

(21) Appl. No.: 16/111,423

(22) Filed: Aug. 24, 2018

(65) Prior Publication Data

US 2020/0064707 A1 Feb. 27, 2020

(51) Int. Cl.
*G02F 1/225* (2006.01)
*G02F 1/21* (2006.01)

(52) U.S. Cl.
CPC .......... *G02F 1/2257* (2013.01); *G02F 1/2255* (2013.01); *G02F 2001/212* (2013.01)

(58) Field of Classification Search
CPC .............................. G02F 1/2257; G02F 1/2255
See application file for complete search history.

(56) References Cited

U.S. PATENT DOCUMENTS 9,841,618 B1* 12/2017 Poulin ................... G02F 1/2255
2005/0254743 A1* 11/2005 Akiyama ............. H04B 10/505
385/3
2011/0074487 A1* 3/2011 Behnia ................. G02F 1/0121
327/355

\* cited by examiner

*Primary Examiner* — Sung H Pak
*Assistant Examiner* — Hoang Q Tran
(74) *Attorney, Agent, or Firm* — Clements Bernard Walker; Lawrence A. Baratta, Jr.; Christopher L. Bernard

(57) ABSTRACT

An optical modulator device and method, including and utilizing: a first optical waveguide arm including one or more optical phase shifters, e.g., pn junctions, and configured to receive a first bias voltage $V_{bias1}$; and a second optical waveguide arm including one or more optical phase shifters, e.g., pn junctions, and configured to receive a second bias voltage $V_{bias2}$; wherein the first bias voltage $V_{bias1}$ and the second bias voltage $V_{bias2}$ are dissimilar, such that the first optical waveguide arm and the second optical waveguide arm exhibit a same phase modulation. $V_{bias1}$ and $V_{bias2}$ are selected such that the corresponding slopes Vπ of the associated phase shift versus applied bias voltage curves are equal. The optical modulator device further includes a driver coupled to the first optical waveguide arm and the second optical waveguide arm and including a current offset control circuit operable for providing $V_{bias1}$ and $V_{bias2}$.

23 Claims, 14 Drawing Sheets

OPTICAL MODULATOR AND OPTICAL MODULATOR DRIVER DEVICES AND METHODS UTILIZING INDEPENDENT ARM BIAS TO MITIGATE FABRICATION ERRORS

FIELD OF THE INVENTION

The proposed solution relates generally to the optical networking field. More specifically, the proposed solution relates to optical modulator and optical modulator driver devices and methods utilizing independent arm bias to mitigate fabrication errors and the like. The proposed solution applies to Mach-Zehnder (MZ) optical modulator devices and the like used in a series push-pull (SPP) configuration, and to MZ optical modulator devices and the like made using silicon-on-insulator wafers (i.e., silicon photonics). The proposed solution also applies to InP, LiNbO$_3$, polymer, and organic-hybrid modulators and the like equally.

BACKGROUND OF THE INVENTION

In silicon, phase modulation is based on a dependency of refractive index property on free carrier density. Accordingly, by building a pn junction within an optical waveguide, and by applying a time-varying reverse voltage to the pn junction, the depletion region of the junction can be modulated, thereby modulating the free carrier density, and hence modulating the refractive index.

In the SPP configuration, two pn junctions each located in each of a pair of optical waveguides of the MZ interferometer are connected back-to-back, with either their n-sides or their p-sides in electrical contact. This configuration is preferred for a low-chirp operation it provides as, in an ideal case, each of the MZ interferometer arms produces an equal but opposite amount of phase shift. In this ideal case, the V$_\pi$ of each arm (i.e., the amount of voltage required to produce a phase change of $\pi$) is the same. FIG. 1 illustrates a SPP device 10 where the diodes 12, representing the pn junctions, are connected by their p-doped regions 14, for example. For high-bandwidth operation, the pn junctions 16 are generally used in depletion mode by applying a reverse bias voltage V$_b$ 18 to the point 20 connecting them back-to-back in series.

One important requirement of the modulator device 10 is that the arms 22 and 24 provide very similar phase modulation efficiency. Arm dissimilarity causes imbalance of the phase modulation, which in turn creates a phase variation of the optical carrier (i.e., chirp) at the output 26 of the modulator device 10.

Dopants of p and n types are implanted at locations defined by lithographic masks aligned over the already-defined waveguides 28. This alignment, performed using stepper lithography or the like, has an accuracy of about 50 nm, while the optical waveguides 28 have a width of about 400 to 500 nm. As compared to the width of the waveguides 28, the typical alignment error is not negligible and may therefore cause a significant variation in modulation efficiency from device to device, even on the same wafer.

Misalignment of lithographic masks employed to wafer level manufacture of the p and n-doped regions with regard to the optical waveguides can induce an imbalance in the modulation efficiency of the arms 22 and 24 of the SPP MZ modulator device 10, as explained herein below.

FIG. 2 (top) shows the pair of back-to-back pn junctions 16 of a SPP MZ modulator device 10 in an nppn configuration when the lithographic masks are well aligned during manufacture. In this example, each pn junction 16 is located in the center of each optical waveguide 28. In each, the modulation of the depletion width of this pn junction 16 affects a portion of the optical mode overlapping with it, which will be, in this case, the same for each optical waveguide 28.

FIG. 2 (bottom) shows the pn junctions 16 of the SPP MZ modulator device 10 in the nppn configuration when the lithographic masks are misaligned during manufacture with respect to their ideal position (i.e., the position defined by design). For simplicity, the same misalignment error for the n and p masks has been illustrated such that the interface of the pn junctions 16 is shifted collectively. This offset of the pn junctions 16 leads to the optical mode in each optical waveguide interacting with a larger portion of p-doped material 30 on the waveguide 28 at the left (MZ arm #1 22) and with a larger portion of n-doped material 34 on the waveguide 28 at the right (MZ arm #2 24). As the index variation associated with the modulation of the p and n-doped material 30 and 34 is different, the modulation efficiency for the two MZ arms 22 and 24 will also differ, causing modulation imbalance.

FIG. 3 illustrates a voltage potential phase shift obtained in each arm of the SPP MZ modulator device 10 (FIGS. 1 and 2) in the case of imperfect manufacture (i.e., misalignment of the lithographic masks defining the doped regions). Although the phase shift difference at the applied reverse bias voltage is not large (at 2V here), the different slopes at this operation point (i.e., the different efficiencies in terms of phase shift per unit voltage applied) are significant. Such a modulator device 10 will induce chirp on the optical carrier and lead to incurring a penalty in the link budget.

A useful figure of merit for quantizing the effect of a mismatch in efficiency (i.e., a mismatch of V$_\pi$) between the arms 22 and 24 (FIG. 1) of the MZ modulator device 10 is the radio frequency (RF) imbalance $\alpha$. In accordance with a small modulation signal approximation, the phase shifts induced in both arms 22 and 24 around the reverse bias voltage of operation V$_{bias}$ can be expressed as a mean phase shift $\Delta\varphi_m$ produced in the two arms 22 and 24, plus or minus a deviation $\Delta\varphi$ from it:

$$\Delta\phi_1 = \Delta\phi_m + \Delta\phi = \Delta\phi_m(1+\alpha) \qquad (1)$$

$$\Delta\phi_2 = \Delta\phi_m - \Delta\phi = \Delta\phi_m(1-\alpha) \qquad (2)$$

The imbalance (or, more generally, the RF imbalance) $\alpha$ is then the relative deviation from this mean phase shift. In the preceding, all phase shifts are defined as:

$$\Delta\phi_i = \frac{d\phi_i}{dV}\bigg|_{V_{bias}} \Delta V \qquad (3)$$

where $\Delta V$ is the voltage difference with respect to the applied bias voltage.

The RF imbalance $\alpha$ can thus be expressed as a function of the slopes of the phase vs voltage characteristics using:

$$\alpha = \frac{\Delta\phi_1 - \Delta\phi_2}{2\Delta\phi_m} = \frac{\frac{d\phi_1}{dV}\big|_{V_{bias}} - \frac{d\phi_2}{dV}\big|_{V_{bias}}}{\frac{d\phi_1}{dV}\big|_{V_{bias}} + \frac{d\phi_2}{dV}\big|_{V_{bias}}} \qquad (4)$$

For example, the RF imbalance at 2V reverse bias in the case of FIG. 3 is −0.096.

It is implicitly understood here that the efficiency of the two pn junctions 16 (FIG. 1) depends upon the frequency at which the voltage (+s, −s) is modulated. As such, differing modulation efficiencies between the two pn junctions 16 could result from them having differing capacitances, leading to a frequency-dependent imbalance, hence the term "RF" imbalance. Additional frequency dependency could result, for example, from the circuit configuration itself, which can lead to one pn junction being driven preferentially over the other at some frequencies, as can be the case of pn junctions 16 used in a SPP configuration and driven by a single-ended driver. For a modulation voltage varying in time, the paths followed on the curves illustrated in FIG. 3 will be different at each frequency of the modulating signal. Although the previous equations do not explicitly indicate the frequency dependency of α (i.e., α(f)), such dependency is understood to be implicitly addressed and covered by the present disclosure.

With a direct current (DC)-coupled driver, some DC voltages are applied by the driver terminals to the modulator electrodes, as illustrated by $V_1$ 38 and $V_2$ 40 in FIG. 4 (e.g., $V_1$ 38 and $V_2$ 40 can be the voltages at the collectors of a differential transistor pair). Also, MZ modulators are often travelling-wave modulators that need to be terminated (illustrated as $R_{T,1}$ 42 and $R_{T,2}$ 44 in FIG. 4, which should ideally be of the same value, or as $R_L$ 44 in FIG. 1). Finally, a frequent configuration is the open-collector configuration, which supplies the transistors' current through the termination, using some voltage, called $V_{dd}$ 46 in FIG. 4. Other sources of imbalance between the two arms 22 and 24 (FIG. 1) of the modulator device 10 (FIG. 1) can result from mismatched termination resistances ($R_{T,1} \neq R_{T,2}$) and mismatched transistors' β parameter (i.e., DC current gain) within the driver. Even if the manufacture does not introduce misalignment of the pn junctions 16 (FIG. 1), these additional sources can contribute, in part, to the RF imbalance α.

As a note, the DC (reverse) bias voltage applied to pn junction i is, according to FIG. 4:

$$V_{bias,i} = V_i - V_b = V_{dd} - R_{T,i}I_{DC,i} - V_b \quad (5)$$

where $I_i$ is the DC current flowing through the termination resistor $R_{T,i}$.

Thus, what is still needed in the art are optical modulator and optical modulator driver devices and methods utilizing independent arm bias to mitigate fabrication errors and the like in MZ optical modulator devices and the like used in a SPP configuration, for example, and to MZ optical modulator devices and the like made using silicon-on-insulator wafers (i.e., silicon photonics), as well as InP, LiNbO$_3$, polymer, and organic-hybrid modulators and the like.

BRIEF SUMMARY OF THE INVENTION

In various embodiments, the arms of the MZ modulator 10 (FIG. 1) of the proposed solution can be made to exhibit the same phase modulation efficiency regardless of manufacturing error(s) by supplying a dissimilar reverse bias voltage to the two MZ modulator arms 22 and 24 (FIG. 1). Separate bias voltages $V_{bias1}$ and $V_{bias2}$ can be used for arms 1 and 2, respectively. At these operating points, the slopes of the "phase vs voltage" curves or characteristics are about equal and, as such, the resulting RF imbalance is about zero. The two pn junctions then display very similar efficiencies (i.e., the same slope, or Vπ). Providing different bias voltages to the pn junctions requires that the voltages V1 and V2 at the driver output terminals be different. This can be achieved through the use of a current offset control circuit in the driver, as is described in greater detail herein below.

In one embodiment, the proposed solution provides an optical modulator device, including: a first optical waveguide arm including one or more optical phase shifters, e.g., pn junctions, and configured to receive a first bias voltage $V_{bias1}$; and a second optical waveguide arm including one or more optical phase shifters, e.g., pn junctions, and configured to receive a second bias voltage $V_{bias2}$; wherein the first bias voltage $V_{bias1}$ and the second bias voltage $V_{bias2}$ are adjusted, such that the first optical waveguide arm and the second optical waveguide arm exhibit one of a same phase modulation and a predetermined different phase modulation. $V_{bias1}$ and $V_{bias2}$ are selected such that the corresponding slopes Vπ of the associated phase shift versus applied bias voltage curves are equal or have a controlled difference. Optionally, $V_{bias1}$ and $V_{bias2}$ are selected such that each is equidistant from an intermediate predetermined bias voltage. The optical modulator device further includes a driver coupled to the first optical waveguide arm and the second optical waveguide arm and including a current offset control circuit operable for providing $V_{bias1}$ and $V_{bias2}$. Optionally, the optical modulator device further includes a driver with a differential output including first output transistor Q1 and second output transistor Q2 that provide the first optical waveguide arm and the second optical waveguide arm with different direct current (DC) currents to set $V_{bias1}$ and $V_{bias2}$ with a single bias voltage $V_b$. The optical modulator device is operable for compensating for one or more of a manufacturing error in either the first optical waveguide arm or the second optical waveguide arm, a manufacturing error in either a first termination resistor $R_{T1}$ or a second termination resistor $R_{T2}$, and a manufacturing error in either the first output transistor Q1 or the second output transistor Q2 of the open collector driver. Optionally, the optical modulator device further includes third transistor Q3 and fourth transistor Q4 that provide $i_{Offset1}$ and $i_{Offset2}$ to $V_{bias1}$ and $V_{bias2}$. The driver includes one of an open collector driver and a back-terminated differential driver. Optionally, current Q1 and current Q2 are sourced from independent current sources. Optionally, the optical modulator device is a silicon photonics series push-pull (SPP) optical modulator device utilizing one of a nppn configuration and a pnnp configuration.

In another embodiment, the proposed solution provides a method for utilizing an optical modulator device, including: applying a first bias voltage $V_{bias1}$ to a first optical waveguide arm including one or more optical phase shifters, e.g., pn junctions; and applying a second bias voltage $V_{bias2}$ to a second optical waveguide arm including one or more optical phase shifters, e.g., pn junctions; wherein the first bias voltage $V_{bias1}$ and the second bias voltage $V_{bias2}$ are adjusted, such that the first optical waveguide arm and the second optical waveguide arm exhibit one of a same phase modulation and a predetermined different phase modulation. Again, $V_{bias1}$ and $V_{bias2}$ are selected such that the corresponding slopes Vπ of the associated phase shift versus applied bias voltage curves are equal or have a controlled difference. Optionally, $V_{bias1}$ and $V_{bias2}$ are selected such that each is equidistant from an intermediate predetermined bias voltage. The optical modulator method further includes coupling a driver to the first optical waveguide arm and the second optical waveguide arm including a current offset control circuit operable for providing $V_{bias1}$ and $V_{bias2}$. Optionally, the optical modulator method further includes providing a driver with a differential output including first output transistor Q1 and second output transistor Q2 that provide the first optical waveguide arm and the second optical waveguide arm with different direct current (DC) currents to set $V_{bias1}$ and $V_{bias2}$ with a single bias voltage $V_b$. The optical modulator device is operable for compensating for one or more of a manufacturing error in either the first optical waveguide arm or the second optical waveguide arm, a manufacturing error in either a first termination resistor $R_{T1}$ or a second termination resistor $R_{T2}$, and a manufacturing error in either the first output transistor Q1 or the second output transistor Q2 of the open collector driver. Optionally, the optical modulator method further includes providing third transistor Q3 and fourth transistor Q4 that provide $i_{Offset1}$ and $i_{Offset2}$ to set $V_{bias1}$ and $V_{bias2}$. The driver includes one of an open collector driver and a back-terminated differential driver. Optionally, current Q1 and current Q2 are sourced from independent current sources. Optionally, the optical modulator device is a silicon photonics series push-pull (SPP) optical modulator device utilizing one of a nppn configuration and a pnnp configuration.

BRIEF DESCRIPTION OF THE DRAWINGS

The proposed solution is illustrated and described herein with reference to the various drawings, in which like reference numbers are used to denote like device components/method steps, as appropriate, and in which.

DETAILED DESCRIPTION OF THE INVENTION

Figure 1:
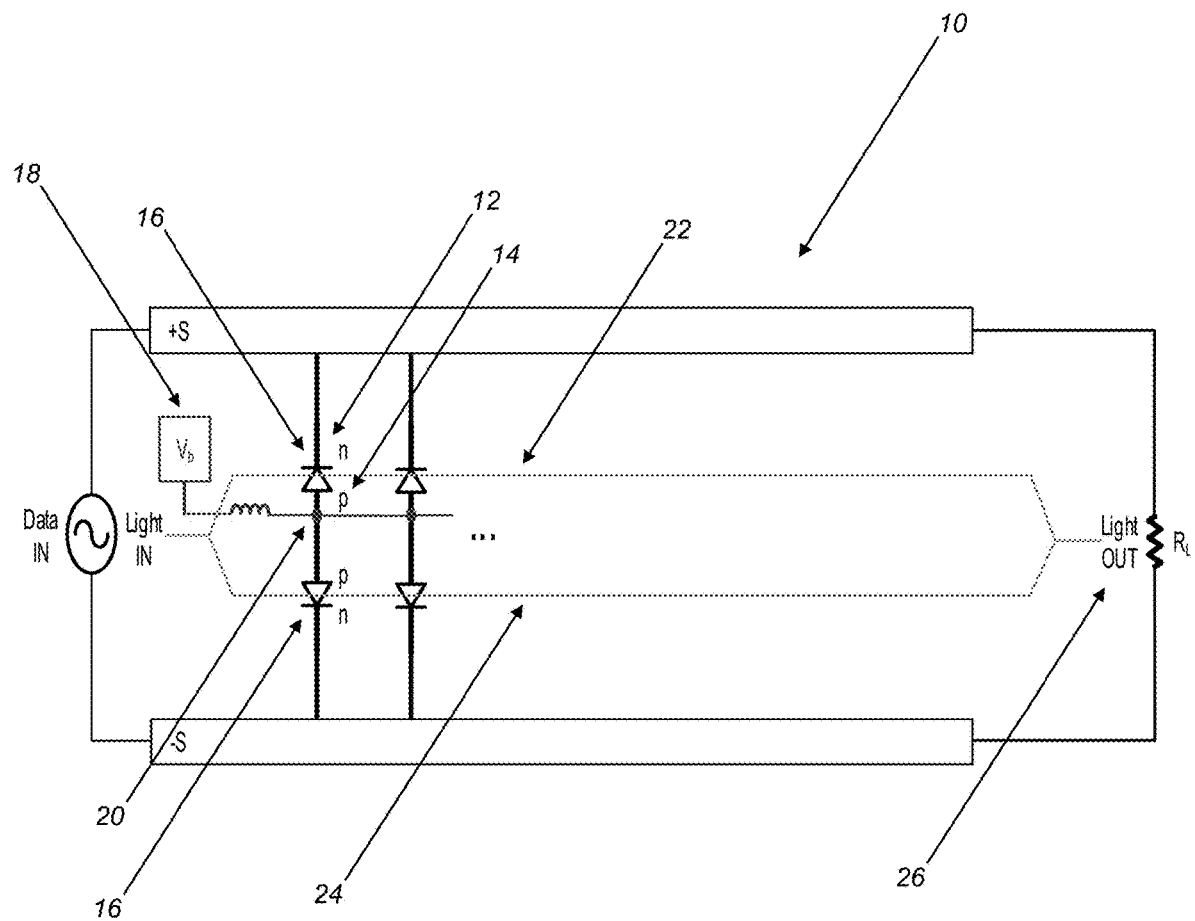
FIG. 1 is a schematic diagram illustrating a conventional SPP modulator in a nppn configuration (note, in this case, $V_b$ is negative)
Figure 2:
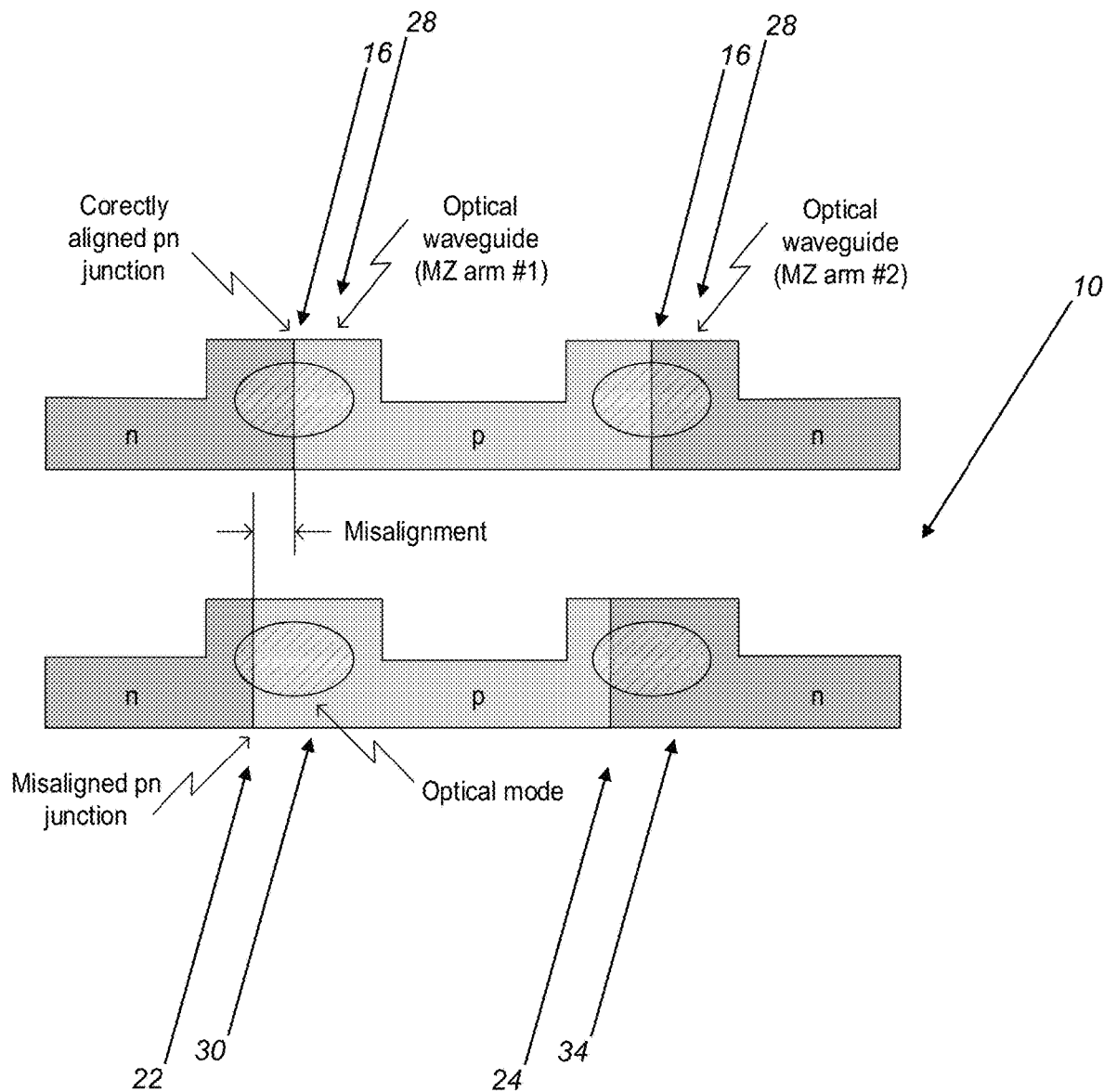
FIG. 2 is a schematic diagram illustrating the pn junctions of an SPP modulator configuration manufactured with perfect (top) and imperfect (bottom) lithographic mask alignment.
Figure 3:
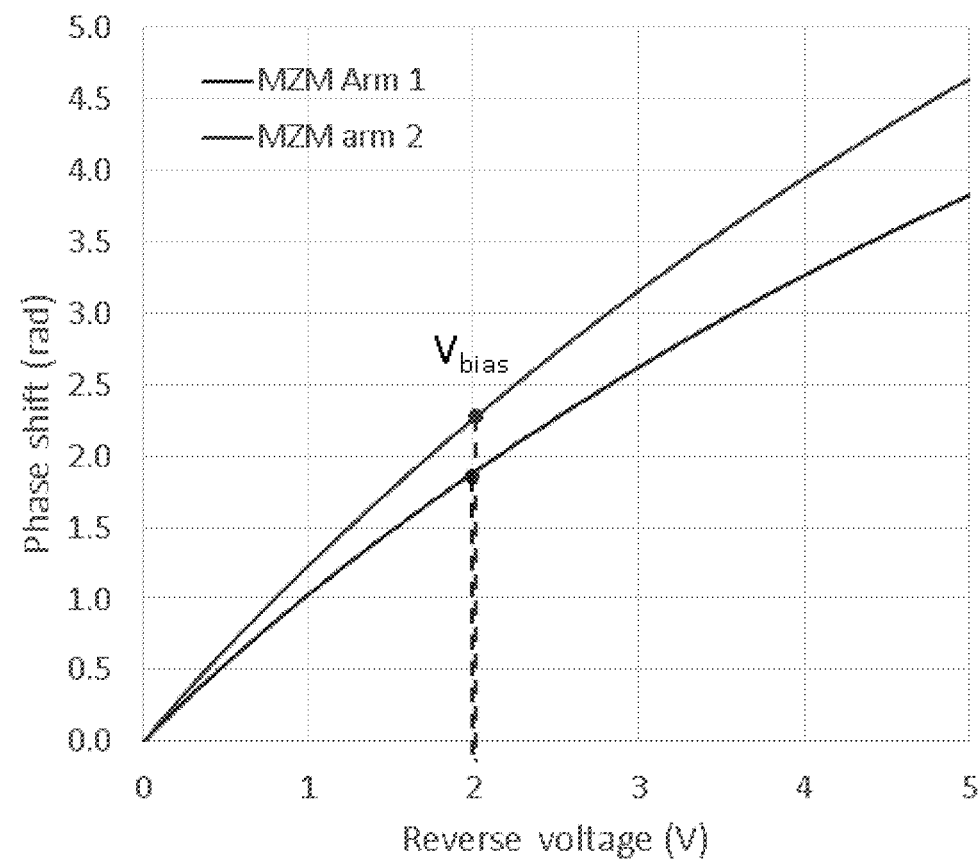
FIG. 3 is a series of plots illustrating phase shift vs applied voltage for the two arms of a MZ modulator device that could result from imperfect manufacture.
Figure 5:
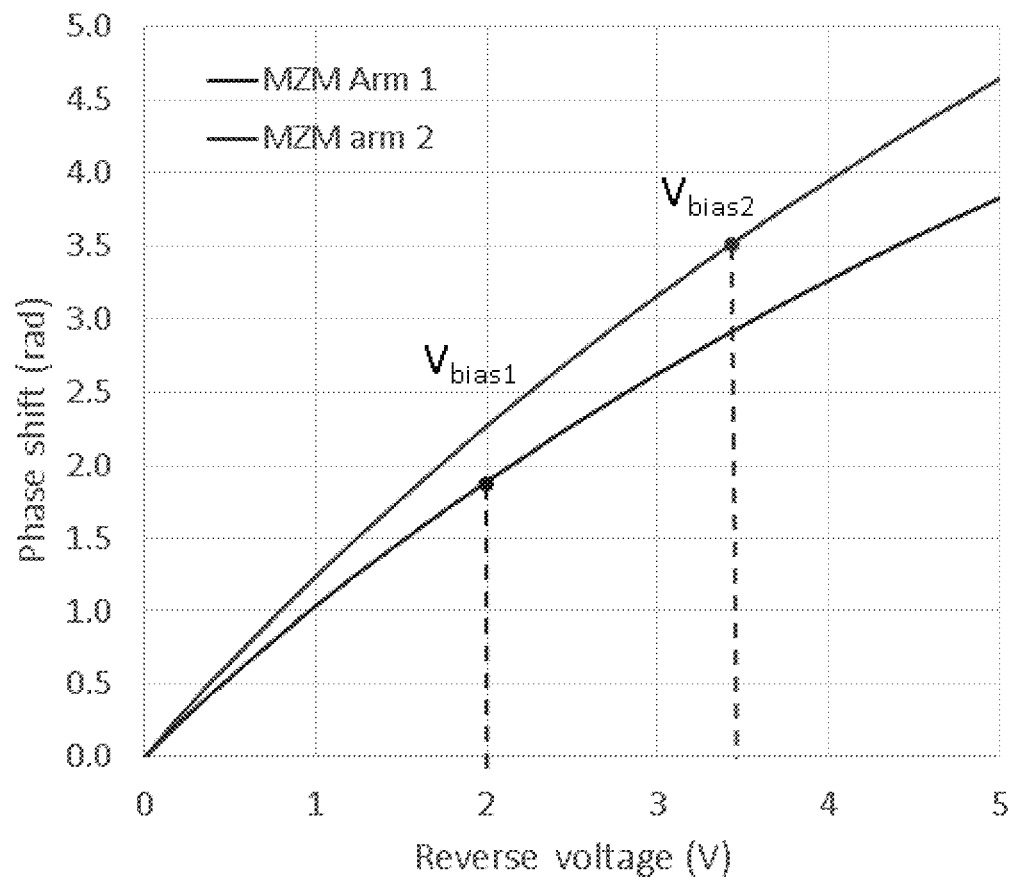
FIG. 5 is a series of plots illustrating phase shift vs applied voltage for the two arms of the MZ modulator device of the proposed solution, in the case of a manufacturing bias.
Figure 6:
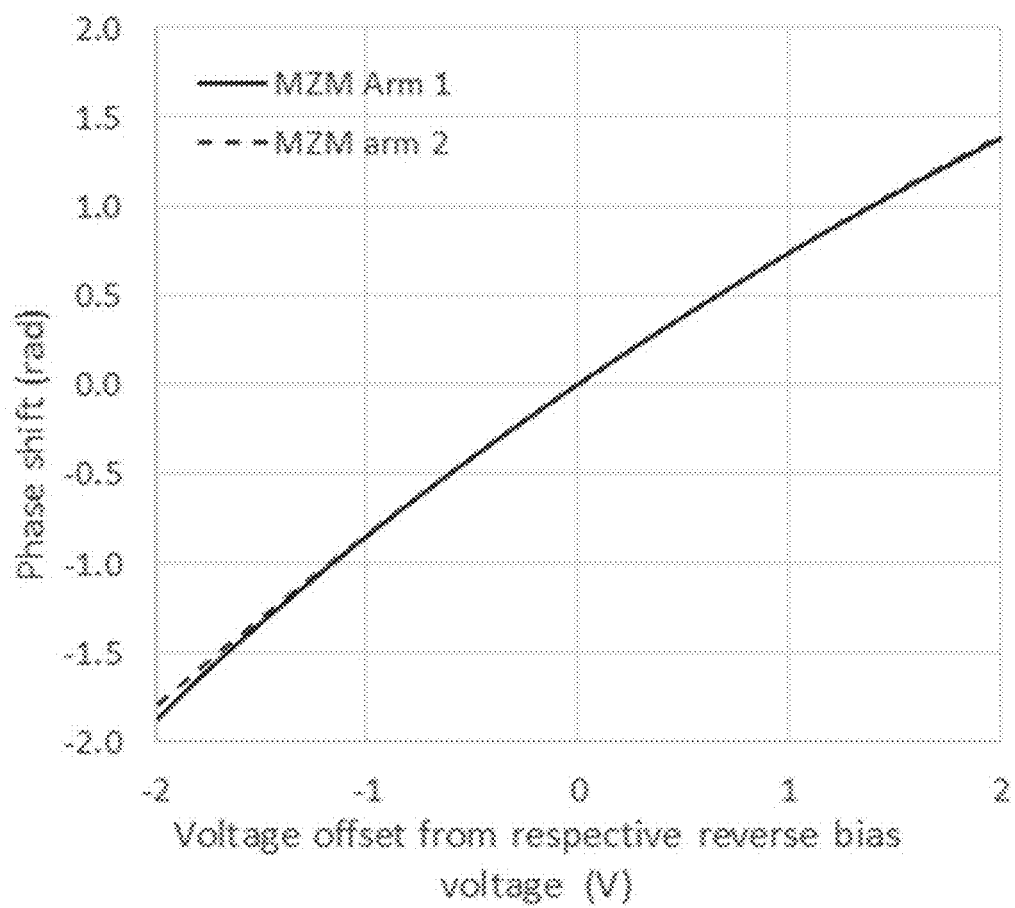
FIG. 6 is a series of plots illustrating the phase shifts in arm 1 and arm 2 with the abscissa showing the offset voltage applied to either pn junction relative to its own reverse bias voltage (i.e., $V_{bias,pn1}$ or $V_{bias,pn2}$)

In accordance with the devices and methods of the proposed solution, the arms of the MZ modulator 10 (FIG. 1) can be made to exhibit the same phase modulation efficiency regardless of any manufacturing error(s) by supplying a dissimilar reverse bias voltage to the two MZ modulator arms 22 and 24 (FIG. 1). This is illustrated in FIG. 5, where separate bias voltages $V_{bias1}$ (2V) and $V_{bias2}$ (3.8V) are used for arms 1 and 2, respectively. At these operating points, the phase shift vs. voltage slopes are equal and, as such, the resulting RF imbalance is close to zero. FIG. 6 further illustrates this by removing the phase shift difference between the curves and by showing in abscissa the modulation voltage applied to either pn junction relative to its own reverse bias voltage. It can be seen that the two pn junctions then display very similar efficiencies (i.e., the same slope, or $V\pi$). Throughout the specification, references to "fabrication" or "manufacture: are understood as "wafer level manufacture."

Figure 4:
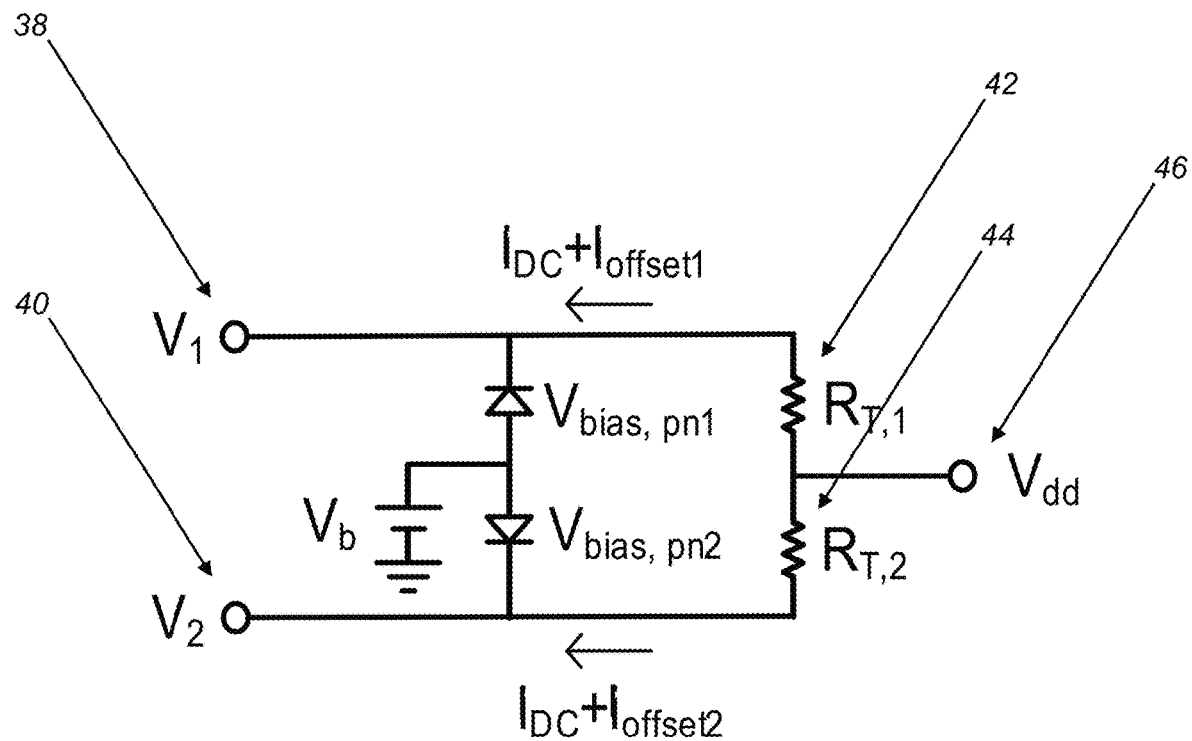
FIG. 4 is a circuit diagram illustrating driver output DC voltages $V_1$ and $V_2$ applied to MZ modulator electrodes, further connected to the two pn junctions in series and to terminations $R_T$.

According to FIG. 4, providing different bias voltages to the pn junctions can employ different voltages V1 and V2 at the driver output terminals. This can be achieved through the use of a current offset control circuit in the driver, as is described in greater detail herein below.

Figure 7:
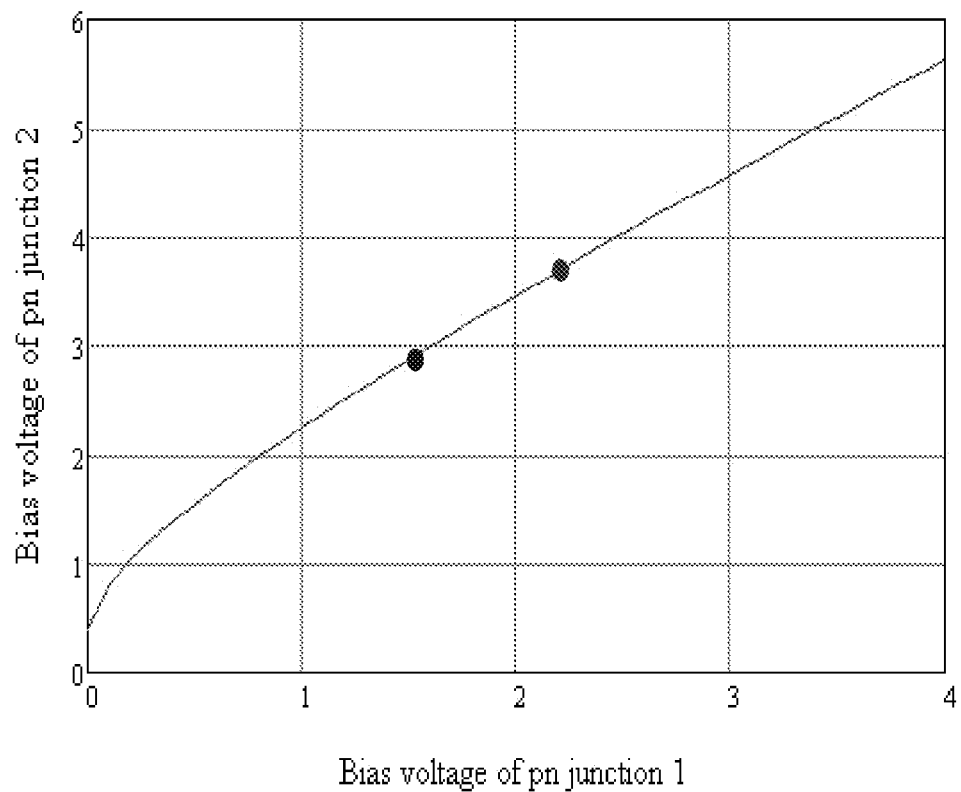
FIG. 7 is a plot illustrating the bias voltage to use for pn junction 2 as a function of the bias voltage used for pn junction 1 enabling cancellation of the RF imbalance (the right dot illustrates the case used in FIG. 5 and the left dot illustrates the case used in FIG. 8)
Figure 8:
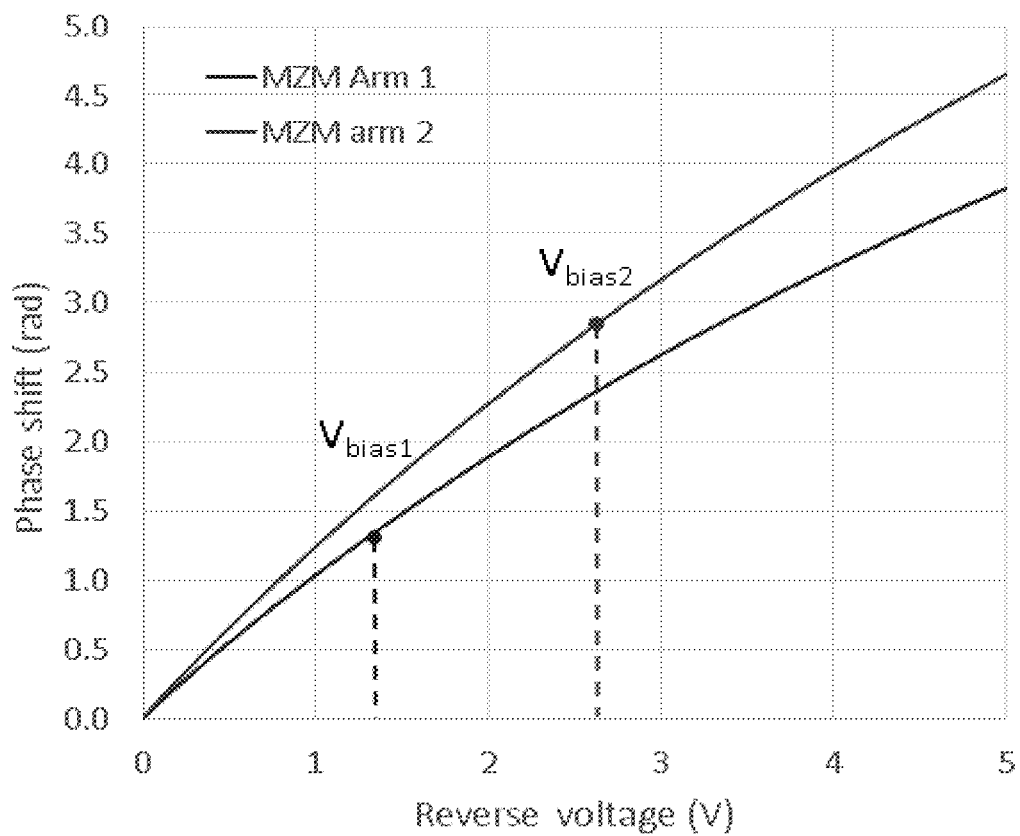
FIG. 8 is a series of plots illustrating the symmetrical variation of the bias voltages around 2V providing cancellation of the RF imbalance.

Before describing examples of circuits that can be used to control the current offsets, one should observe that, in the previous example, one of the bias voltages was kept unchanged (at 2V) while the other was adjusted to cancel the RF imbalance. This is not necessarily the way electronic circuits operate. Rather, one of the bias voltages can be reduced, while the other can be increased, potentially by the same amount. considering the RF imbalance when the change in bias voltage for one pn junction is equal and opposite to that for the other pn junction, FIG. 7 shows sets of bias voltages that enable the cancellation of the RF imbalance. At $V_{bias,pn1}=1.33V$ and $V_{bias,pn2}=2.67V$, the pn junction reverse bias voltages sit at equal distances on each side of the mean bias voltage of 2V and the RF imbalance is cancelled. This configuration is illustrated in FIG. 8.

Figure 9:
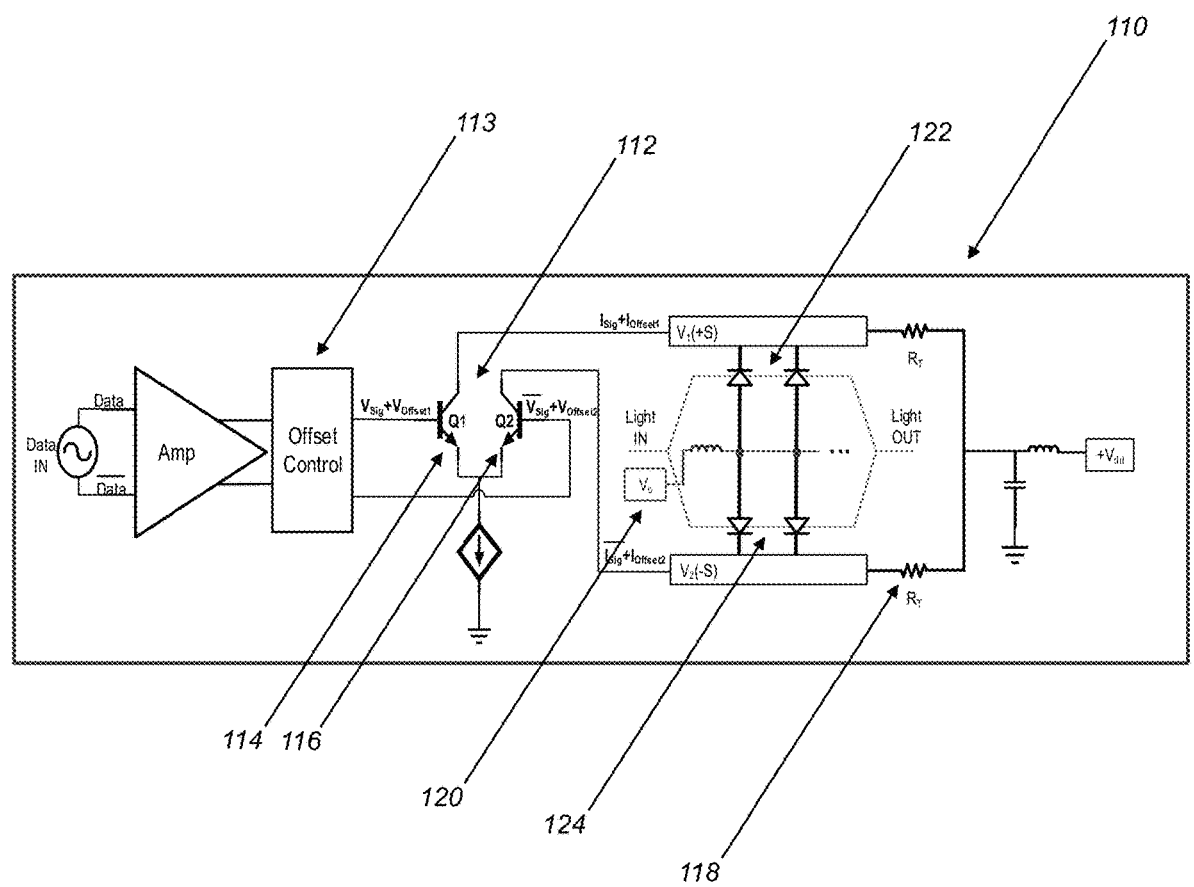
FIG. 9 is a schematic diagram illustrating one embodiment of the MZ modulator device of the proposed solution using a nppn SPP configuration, driven with a dissimilar DC current from an open collector driver.

FIG. 9 illustrates MZ modulator device 110 of the proposed solution in the case of an open collector (i.e., a drain for MOS devices) driver (i.e., a current or transconductance driver) with a differential output 112, whereby each driver arm 114 and 116 provides a different DC current ($I_{Offset1}$ and $I_{Offset2}$). This results in a dissimilar voltage drop at the terminations RT 118, resulting in a dissimilar reverse bias voltage for the two pn junctions forming the SPP MZ modulator device 110. This configuration allows using a single bias voltage $V_b$ 120 to polarize the pn junctions so that they operate in the depletion mode (i.e., reverse bias operation), but operate with different reverse bias voltages $V_{bias,pn1}$ and $V_{bias,pn2}$, as described herein above.

According to FIGS. 4 and 9, the change in the reverse bias voltage applied to pn junction i relates to the amount of current offset provided by the driver $I_{Offset,i}$:

$$\Delta V_{bias,i} = R_T \Delta i_{Offset,i} \qquad (6)$$

In accordance with a practical example employing a mean driver DC current of 50 mA circulating in each resistor $R_T$, the amount of current variation could be limited to around ±20% of the driver current (i.e., ±10 mA). Across 25Ω resistors, this leads to a change in bias voltage of ±0.25V. Operating pn junction 1 at 1.75V and pn junction 2 at 2.25V leads to a RF imbalance α=−0.06, in the illustrative example presented earlier. Although this does not completely cancel the RF imbalance, it can be sufficient to make the MZ modulator component meet the applicable RF imbalance specification and/or make the overall system meet the applicable link budget. The use of such current offset capability within the driver can provide a sufficient adjustment in the pn junction reverse bias to shift the statistical distribution of the MZ modulator RF imbalance and increase the yield significantly.

Not only can this configuration compensate for MZ modulator inefficiency, it can also compensate for manufacturing errors in the two termination resistors, $R_{T1}$ 42 and $R_{T2}$ 44, in FIG. 4. In an ideal scenario where the two MZ modulator electrodes have no manufacturing errors and have identical efficiencies, the same DC voltages $V_1$ 38 and $V_2$ 40 (FIG. 4) would be desirably applied to each electrode, where $V_1 = V_2 = V_{dd} - I_{DC}R_T$ (i.e., $I_{Offset}$ would be 0 in this case). However, due to manufacturing errors in the two resistors $R_T$ forming the termination, dissimilar $V_1$ 38 and $V_2$ 40 could result, which would lead to unequal reverse bias voltages applied to the two pn junctions. In this case, the driver would be configured to apply different current offsets at the outputs of its two arms, such that the resultant voltage drops across $R_{T1}$ 42 and $R_{T2}$ 44 are similar; in other words, $I_{DC}R_{T,1} + I_{Offset1}R_{T,1} = I_{DC}R_{T,2} + I_{Offset2}R_{T,2}$.

This configuration can also correct for manufacturing errors in the driver's output transistors Q1 114 and Q2 116, where the β (i.e., current gain) of the two transistors could not be made identical through manufacture, resulting in differing $I_{offset1}$ and $I_{offset2}$. To compensate, dissimilar $V_{offset}$ are applied to the base of Q1 114 and Q2 116. In FIG. 9, the offset control 113 includes the electronics determining the applicable current offsets.

Figure 10:
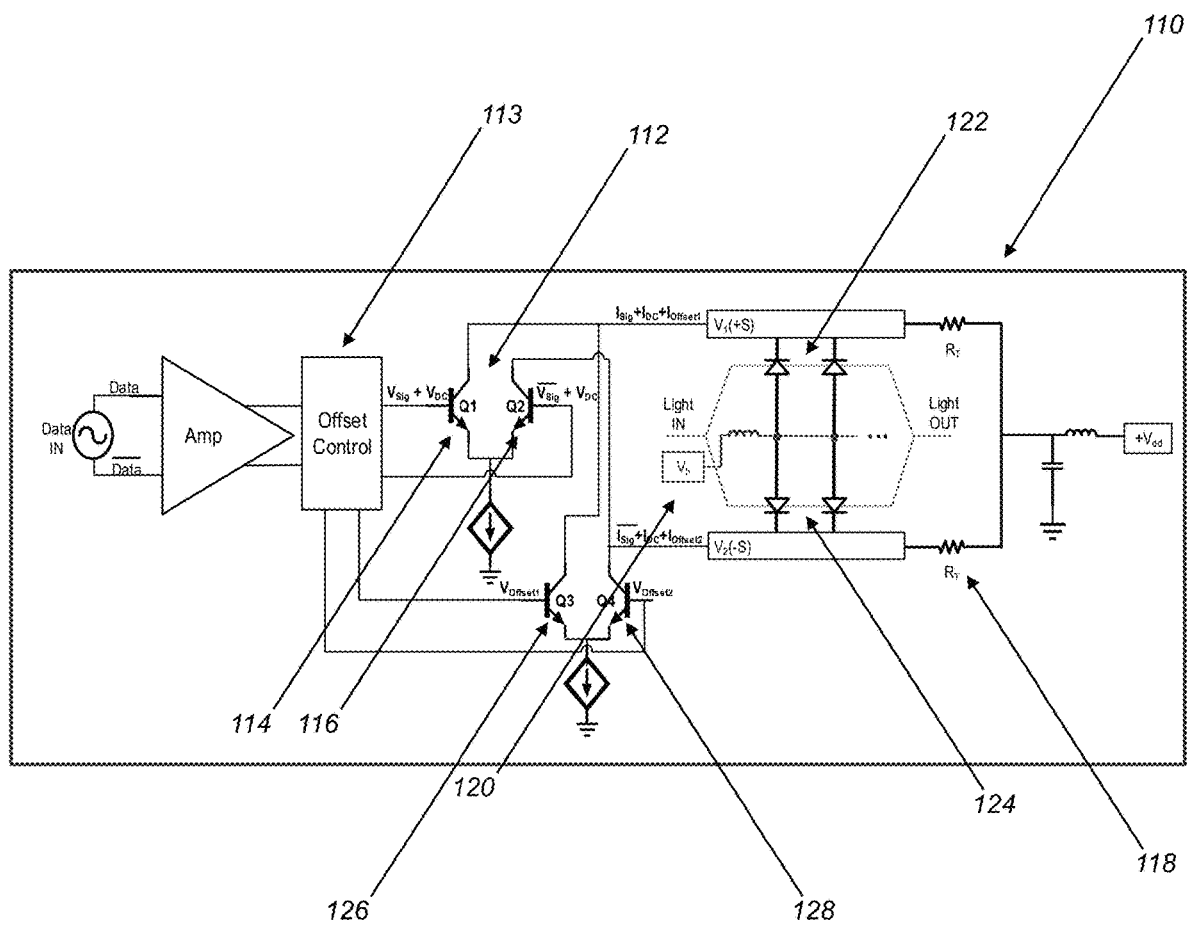
FIG. 10 is a schematic diagram illustrating another embodiment of the MZ modulator device of the proposed solution using a nppn SPP configuration, driven with a dissimilar DC current from an open collector driver, with separate transistors providing offset currents.

FIG. 10 provides a variation of FIG. 9, where the offset is provided using two additional transistors Q3 126 and Q4 128. These transistors Q1 114 and Q2 116 provide the modulated complementary currents $I_{sig}$ and $\bar{I}_{sig}$ and DC current $I_{DC}$. Transistors Q3 126 and Q4 128 add the offset correction current $I_{offset1}$ and $I_{offset2}$ to correct for manufacturing errors. This combination enables a larger correction range for the pn junction reverse bias voltage, enabling not only reduction of the RF imbalance, but sufficient cancellation, while reducing distortion.

Figure 11:
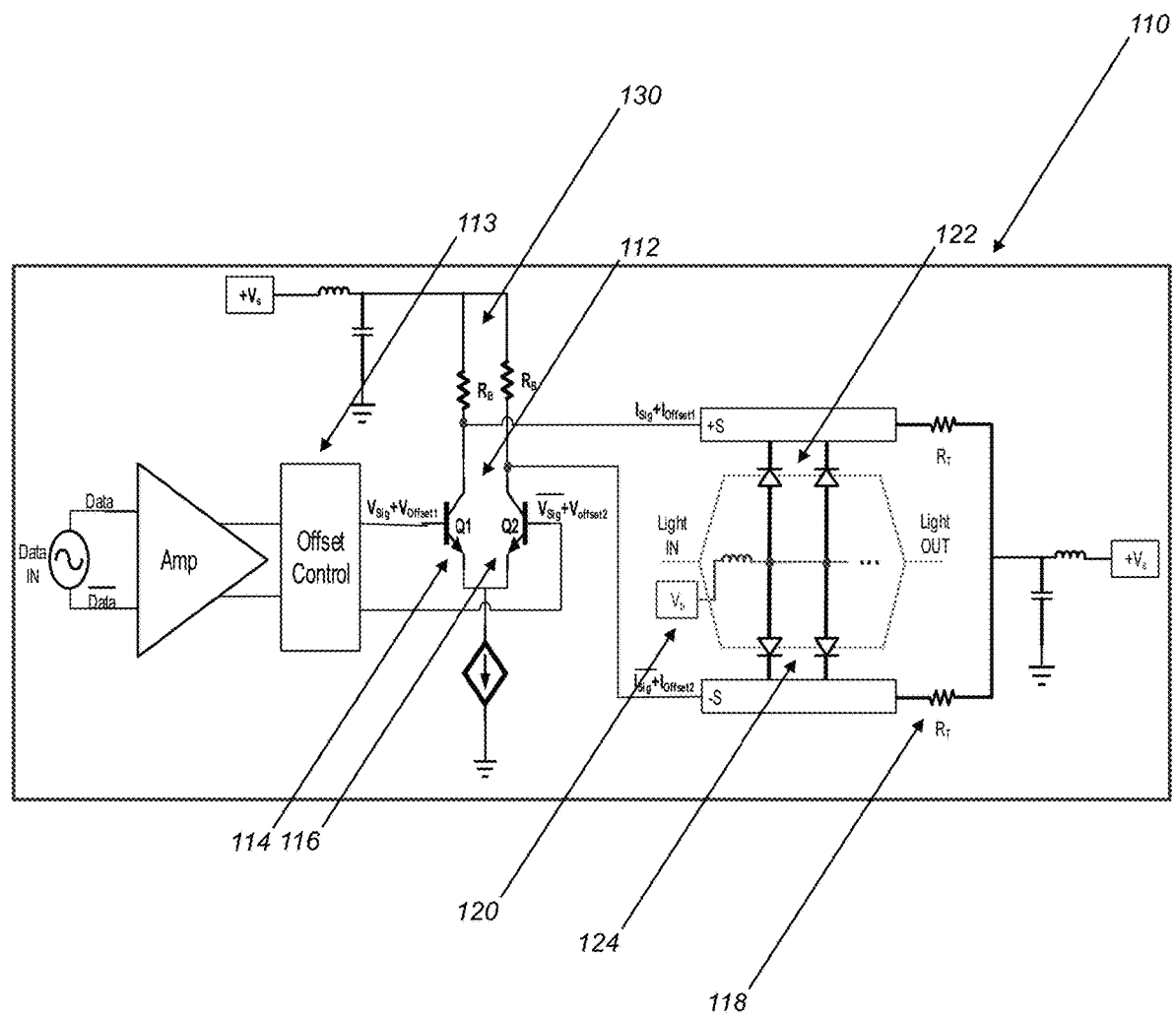
FIG. 11 is a schematic diagram illustrating a further embodiment of the MZ modulator device of the proposed solution using a nppn SPP configuration, driven with a dissimilar DC current from a back-terminated differential driver.

FIG. 11 illustrates the MZ modulator device 110 of the proposed solution employing a back-terminated differential driver 130 with a differential output 112, whereby each driver arm 114 and 116 provides a different DC current ($I_{Offset1}$ and $I_{Offset2}$). Again, this results in a dissimilar voltage drop at the terminations RT 118, resulting in a dissimilar reverse bias voltage for the two pn junctions forming the SPP MZ modulator device 110. This configuration allows using a single bias voltage $V_b$ 120 to bias the pn junctions so that they operate in the depletion mode (i.e., reverse bias operation), but operate with different individual reverse bias voltages $V_{bias,pn1}$ and $V_{bias,pn2}$, as described herein above.

Figure 12:
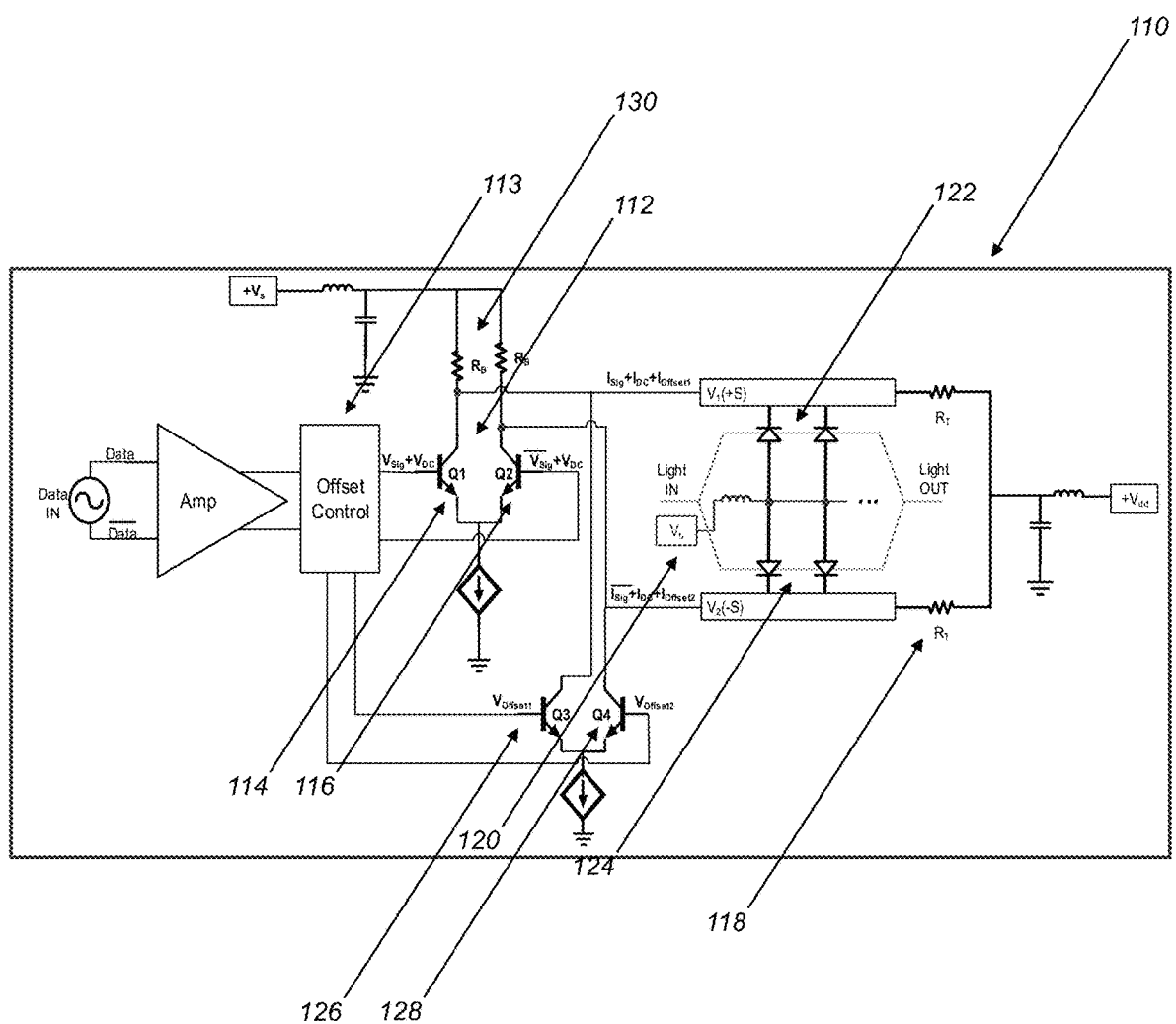
FIG. 12 is a schematic diagram illustrating a still further embodiment of the MZ modulator device of the proposed solution using a nppn SPP configuration, driven with a dissimilar DC current from a back-terminated differential driver, with separate transistors providing the offset currents.

FIG. 12 provides a variation of FIG. 11, where the offset is provided using two additional transistors Q3 126 and Q4 128. The transistors Q1 114 and Q2 116 provide the modulated complementary currents $I_{sig}$ and $\bar{I}_{sig}$ and DC current $I_{DC}$. Transistors Q3 126 and Q4 128 add the offset correction current $I_{offset1}$ and $I_{offset2}$ to correct for manufacturing errors. Again, this configuration enables a larger correction range for the pn junction reverse bias voltage, enabling not only reduction of the RF imbalance, but sufficient cancellation, while reducing distortion.

Figure 13:
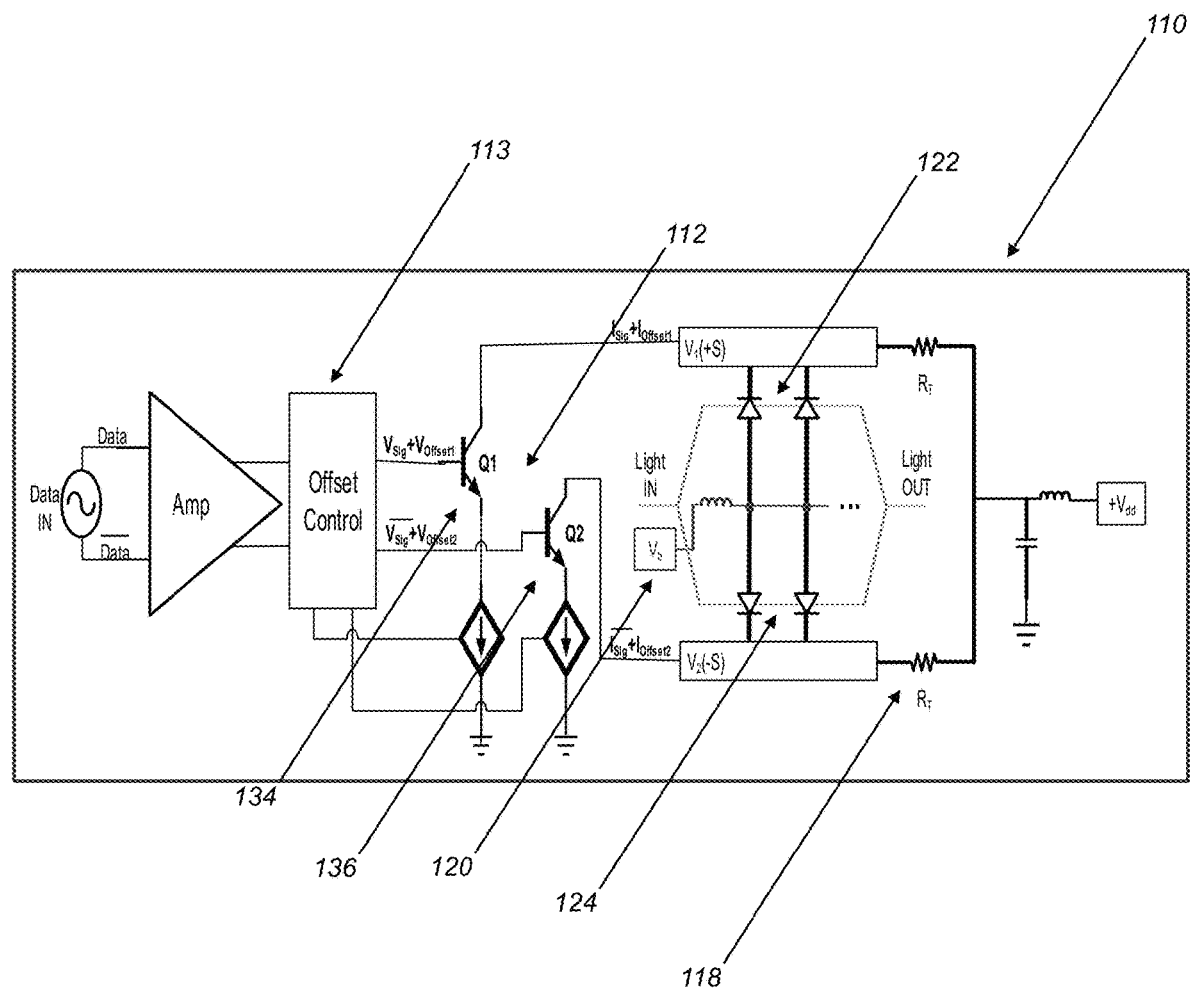
FIG. 13 is a schematic diagram illustrating a still further embodiment of the MZ modulator device of the proposed solution using a nppn SPP configuration, driven with a dissimilar DC current from an open collector driver, where a single-ended output is utilized with Q1 and Q2 controlling the offset current sourced from two independent current sources.

FIG. 13 illustrates the MZ modulator device 110 of the proposed solution employing an open collector (i.e., a drain for MOS devices) driver (i.e., a current or transconductance driver) with a differential output 112, whereby each driver arm 134 and 136 provides a different DC current ($i_{Offset1}$ and $i_{Offset2}$). This results in a dissimilar voltage drop at the terminations RT 118, resulting in a dissimilar reverse bias voltage for the two pn junctions forming the SPP MZ modulator device 110. This configuration allows using a single bias voltage $V_b$ 120 to bias the pn junctions so that they operate in the depletion mode (i.e., reverse bias operation), but operate with different individual reverse bias voltages $V_{bias,pn1}$ and $V_{bias,pn2}$, as described herein above. In this single-ended output embodiment, Q1 134 and Q2 136, which control the offset current, are sourced from two independent current sources associated with the open collector driver 112.

Figure 14:
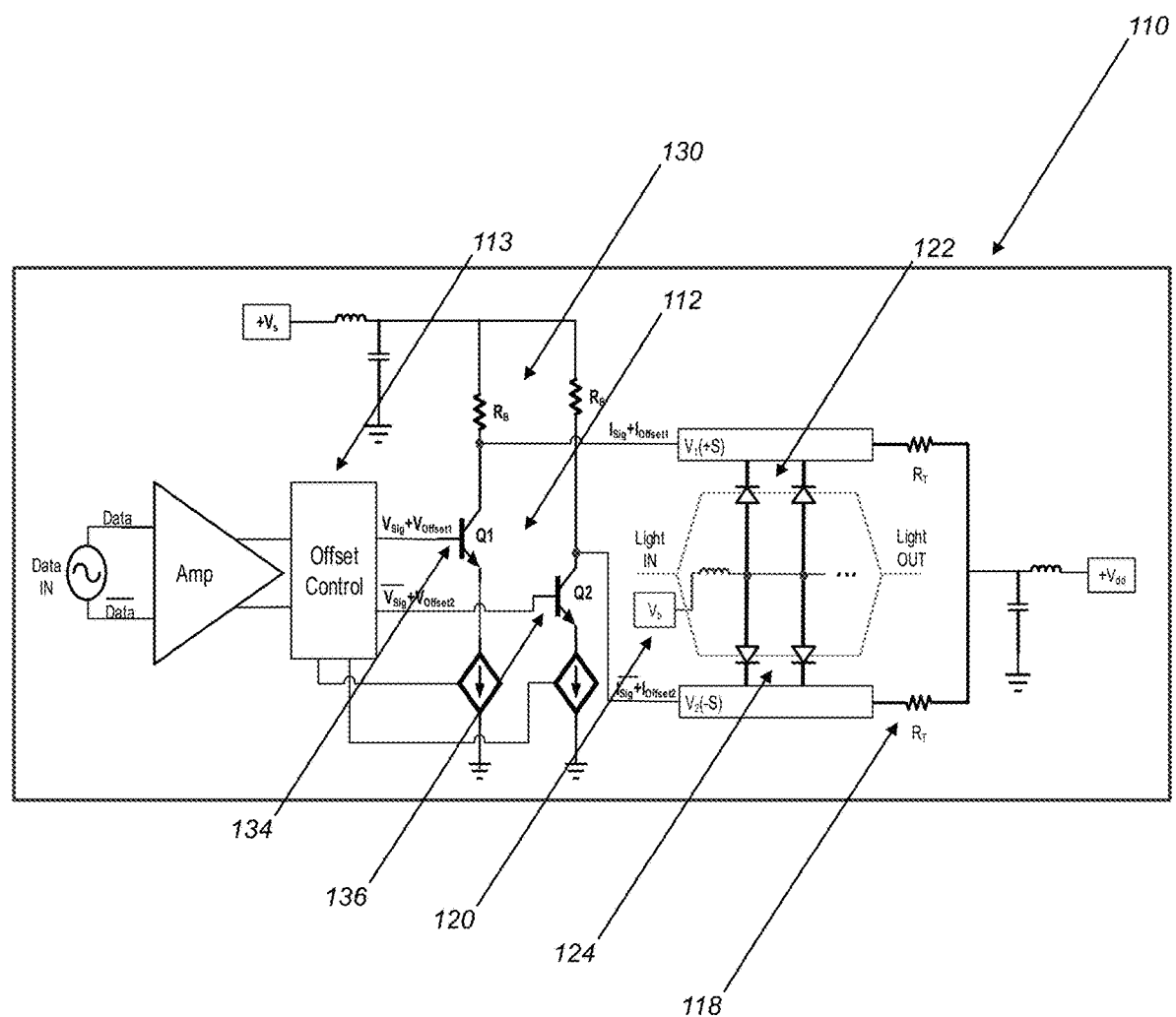
FIG. 14 is a schematic diagram illustrating a still further embodiment of the MZ modulator device of the proposed solution using a nppn SPP configuration, driven with a dissimilar DC current from a back-terminated differential driver, where a single-ended output is utilized with Q1 and Q2 controlling the offset current sourced from two independent current sources.

FIG. 14 illustrates the MZ modulator device 110 of the proposed solution employing a back-terminated differential driver 130 with a differential output 112, whereby each driver arm 134 and 136 provides a different DC current ($i_{Offset1}$ and $i_{Offset2}$). Again, this results in a dissimilar voltage drop at the terminations RT 118, resulting in a dissimilar reverse bias voltage for the two pn junctions forming the SPP MZ modulator device 110. This configuration employs a single bias voltage $V_b$ 120 to bias the pn junctions so that they operate in the depletion mode (i.e., reverse bias operation), but operate with different reverse bias voltages $V_{bias,pn1}$ and $V_{bias,pn2}$, as described herein above. In this single-ended output embodiment, Q1 134 and Q2 136, which control the offset current, are again sourced from two independent current sources associated with the back-terminated differential driver 130.

The apparatuses, circuits, and methods described herein are broadly applicable to lumped and distributed driver and MZ modulator element applications, applying equally to SPP applications utilizing a pnnp configuration, for example. These apparatuses, circuits, and methods can be applied to reverse biased pn junctions, as well as to pn junctions in forward conduction. The apparatuses, circuits, and methods are applicable to modulators utilizing multiple sections, each section being driven individually by its own driver. Each section could be driven with the same signal shifted in time or using different signals, as in an optical DAC (with each section driven by the signal corresponding to one bit of the modulation format), for example.

The proposed apparatuses, circuits, and methods improve the robustness of a MZ modulator to mask misalignment during its manufacture by providing independent bias to each pn junction, while at the same time enabling an open collector drive for maximum power/electrical swing being delivered to the modulator. Advantageously, the apparatuses, circuits, and methods consume less power and are more compact than conventional schemes.

Conventional MZ linear drivers for high-order n-QAM/OFDM coherent and high-order PAM-n/DMT intensity modulation systems and carrier-less amplitude phase modulation (CAP-n) systems intentionally attempt to have the same common mode voltage or collector current traveling in both output complements Q1 and Q2 in order to minimize even order harmonic distortion. As the result of this architecture, a common bias V1 and V2 on the two MZ modulator arms +S and −S is provided, where V1=V2=Vdd−$I_{DC}$ $R_T$. This is applicable to both open collector and back-terminated drivers. The shortcoming of this solution is that it does not address MZ modulator arm mismatch or termination resistor mismatch, as discussed herein above.

To address this shortcoming, it has been proposed to independently bias the pn junctions in the two MZ modulator arms by using a driver (either open collector/drain or back-terminated) that is supplied with two different voltages that can be independently adjusted to address the MZ modulator imbalance and termination resistor $R_T$ inequalities. However, this configuration is disadvantageous. Although it does solve the MZ modulator imbalance with two separate supplies Vsp and Vsn, it is very complex to implement since it requires two independent voltage regulators, increasing the complexity in highly-integrated and compact solutions.

It is further possible to AC-couple the driver (either open collector/drain or back-terminated) to the MZ modulator. Again, the driver is supplied with two different voltages that can be independently adjusted to solve the MZ modulator imbalance and termination resistor $R_T$ inequalities. Again, this configuration is disadvantageous. While it does solve the MZ modulator imbalance with two separate supplies, the driver current $I_{DC}$ is isolated to inductors, thus eliminating the current requirements on the two independent MZ modulator bias supplies. This is very complex to manufacture, since it requires the addition of bias tees and DC blocks to isolate the DC common mode of the driver from the MZ modulator bias, thus increasing the complexity in highly-integrated and compact packaging solutions and moreover increasing RF losses.

Thus, known solutions either do not provide a solution to MZ modulator or termination resistor imbalance, and in configurations where they do provide an imbalance solution, they are complex in terms of packaging and implementation, whereby additional DACs and regulators are required to provide independent bias and bias tees and DC blocks to distinguish the driver output common mode voltage from the MZ modulator bias. This prohibits use in compact highly-integrated packages, such as Coherent Optical Sub-Assemblies (COSAs) and Integrated Coherent Transmitter-Receiver Optical Sub-Assemblies (IC-TROSAs).

All embodiments of the proposed solution are based on controlling the DC offset of the driver output complements, resulting in modulator pairs that have the same efficiency, thereby sufficiently negating manufacturing error and resultant modulator chirp. In the transmitter section of a COSA, for example, RF imbalance is one important parameter of the modulator, such as one required for QPSK modulation. One cause of RF imbalance is the unequal phase modulation efficiency in the two arms of the MZ modulator. The proposed solution minimizes the RF imbalance of modulators and increases the manufacturing yield, improving transmitter performance to meet a chirp parameter <±0.05, for example, while providing a compact solution as optical modems evolve to being highly integrated and compact for inclusion into pluggables and optics-on-board (OBO) solutions. It should be noted that the devices and methods of the proposed solution are not limited to SiP-based technologies, but could also benefit InP-based modulators and the like as they would also have some manufacturing errors, even if to a smaller degree.

Although the proposed solution is illustrated and described herein with reference to preferred embodiments and specific components thereof, it will be readily apparent to those of ordinary skill in the art that other embodiments and components may perform similar functions and/or achieve like results. All such equivalent embodiments and components are within the spirit and scope of the proposed solution, are contemplated thereby, and are intended to be covered by the following non-limiting claims for all purposes.

What is claimed is:

1. An optical modulator device, comprising:
   a first optical waveguide arm comprising one or more optical phase shifters and configured to receive a first bias voltage $V_{bias1}$;
   a second optical waveguide arm comprising one or more optical phase shifters and configured to receive a second bias voltage $V_{bias2}$; and
   a driver coupled to both the first optical waveguide arm and the second optical waveguide arm and comprising a current offset control circuit operable for providing $V_{bias1}$ and $V_{bias2}$, wherein the driver has a differential output comprising a first output transistor Q1 and a second output transistor Q2 that provide the first optical waveguide arm and the second optical waveguide arm with different direct current (DC) currents to set $V_{bias1}$ and $V_{bias2}$ from a single bias voltage $V_b$,
   wherein the first bias voltage $V_{bias1}$ and the second bias voltage $V_{bias2}$ are dissimilar based on the different DC currents from the current offset control circuit connected to the driver, such that the first optical waveguide arm and the second optical waveguide arm exhibit one of a same phase modulation and a predetermined different phase modulation.

2. The optical modulator device of claim 1, wherein $V_{bias1}$ and $V_{bias2}$ are selected such that the corresponding slopes Vπ of the associated phase shift versus applied bias voltage curves are equal or have a controlled difference.

3. The optical modulator device of claim 1, wherein $V_{bias1}$ and $V_{bias2}$ are selected such that each is equidistant from an intermediate predetermined bias voltage.

4. The optical modulator device of claim 1, wherein the optical modulator device is operable for compensating for one or more of a manufacturing error in either the first optical waveguide arm or the second optical waveguide arm, a manufacturing error in either a first termination resistor $R_{T1}$ or a second termination resistor $R_{T2}$, and a manufacturing error in either the first output transistor Q1 or the second output transistor Q2 of the open collector driver.

5. The optical modulator device of claim 1, further comprising third transistor Q3 and fourth transistor Q4 that provide $i_{Offset1}$ and $i_{Offset2}$ to set $V_{bias1}$ and $V_{bias2}$.

6. The optical modulator device of claim 1, wherein the driver comprises one of an open collector driver and a back-terminated differential driver.

7. The optical modulator device of claim 1, wherein current Q1 and current Q2 are sourced from independent current sources.

8. The optical modulator device of claim 1, wherein the optical modulator device is a silicon photonics series push-pull (SPP) optical modulator device utilizing one of a nppn configuration and a pnnp configuration.

9. A method for utilizing an optical modulator device, comprising:
  applying a first bias voltage $V_{bias1}$ to a first optical waveguide arm comprising one or more optical phase shifters;
  applying a second bias voltage $V_{bias2}$ to a second optical waveguide arm comprising one or more optical phase shifters; and
  coupling a driver to both the first optical waveguide arm and the second optical waveguide arm comprising a current offset control circuit operable for providing $V_{bias1}$ and $V_{bias2}$, wherein the driver has a differential output comprising first output transistor Q1 and second output transistor Q2 that provide the first optical waveguide arm and the second optical waveguide arm with different direct current (DC) currents to provide $V_{bias1}$ and $V_{bias2}$ from a single bias voltage $V_b$
  wherein the first bias voltage $V_{bias1}$ and the second bias voltage $V_{bias2}$ are dissimilar based on the different DC currents from the current offset control circuit connected to the driver, such that the first optical waveguide arm and the second optical waveguide arm exhibit one of a same phase modulation and a predetermined different phase modulation.

10. The optical modulator method of claim 9, wherein $V_{bias1}$ and $V_{bias2}$ are selected such that the corresponding slopes Vπ of the associated phase shift versus applied bias voltage curves are equal or have a controlled difference.

11. The optical modulator method of claim 9, wherein $V_{bias1}$ and $V_{bias2}$ are selected such that each is equidistant from an intermediate predetermined bias voltage.

12. The optical modulator method of claim 9, wherein the optical modulator device is operable for compensating for one or more of a manufacturing error in either the first optical waveguide arm or the second optical waveguide arm, a manufacturing error in either a first termination resistor $R_{T1}$ or a second termination resistor $R_{T2}$, and a manufacturing error in either the first output transistor Q1 or the second output transistor Q2 of the open collector driver.

13. The optical modulator method of claim 9, further comprising providing third transistor Q3 and fourth transistor Q4 that provide $i_{Offset1}$ and $i_{Offset2}$ to set $V_{bias1}$ and $V_{bias2}$.

14. The optical modulator method of claim 9, wherein the driver comprises one of an open collector driver and a back-terminated differential driver.

15. The optical modulator method of claim 9, wherein current Q1 and current Q2 are sourced from independent current sources.

16. The optical modulator method of claim 9, wherein the optical modulator device is a silicon photonics series push-pull (SPP) optical modulator device utilizing one of a nppn configuration and a pnnp configuration.

17. An optical modulator driver device, comprising:
  a driver connected to a current offset control circuit operable for providing a first bias voltage $V_{bias1}$ and a second bias voltage $V_{bias2}$;
  a first optical waveguide arm coupled to the driver via a first output transistor Q1 coupled to the current offset control circuit and comprising one or more optical phase shifters and configured to receive the first bias voltage $V_{bias1}$; and
  a second optical waveguide arm coupled to the driver via a second output transistor Q2 coupled to the current offset control circuit and comprising one or more optical phase shifters and configured to receive the second bias voltage $V_{bias2}$;
  wherein the driver comprises a differential output comprising the first output transistor Q1 and the second output transistor Q2 that provide the first optical waveguide arm and the second optical waveguide arm with different direct current (DC) currents to set $V_{bias1}$ and $V_{bias2}$ from a single bias voltage $V_b$;
  wherein the first bias voltage $V_{bias1}$ and the second bias voltage $V_{bias2}$ are dissimilar based on the different DC currents from the current offset control circuit connected to the driver, such that the first optical waveguide arm and the second optical waveguide arm exhibit one of a same phase modulation and a predetermined different phase modulation.

18. The optical modulator driver device of claim 17, wherein $V_{bias1}$ and $V_{bias2}$ are selected such that the corresponding slopes Vπ of the associated phase shift versus applied bias voltage curves are equal or have a controlled difference.

19. The optical modulator driver device of claim 17, wherein $V_{bias1}$ and $V_{bias2}$ are selected such that each is equidistant from an intermediate predetermined bias voltage.

20. The optical modulator driver device of claim 17, wherein the optical modulator driver device is operable for compensating for one or more of a manufacturing error in either the first optical waveguide arm or the second optical waveguide arm, a manufacturing error in either a first termination resistor $R_{T1}$ or a second termination resistor $R_{T2}$, and a manufacturing error in either the first output transistor Q1 or the second output transistor Q2 of the open collector driver.

21. The optical modulator driver device of claim 17, wherein the driver comprises third transistor Q3 and fourth transistor Q4 that provide $i_{Offset1}$ and $i_{Offset2}$ to set $V_{bias1}$ and $V_{bias2}$.

22. The optical modulator driver device of claim 17, wherein the driver comprises one of an open collector driver and a back-terminated differential driver.

23. The optical modulator driver device of claim 17, wherein current Q1 and current Q2 are sourced from independent current sources.

* * * * *